(12) United States Patent
Umesh et al.

(10) Patent No.: US 8,275,565 B2
(45) Date of Patent: Sep. 25, 2012

(54) RADIO COMMUNICATION APPARATUS AND RADIO COMMUNICATION METHOD USED IN MOBILE COMMUNICATION SYSTEM

(75) Inventors: Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 495 days.

(21) Appl. No.: 12/305,325

(22) PCT Filed: Jun. 15, 2007

(86) PCT No.: PCT/JP2007/062157
§ 371 (c)(1),
(2), (4) Date: Mar. 20, 2009

(87) PCT Pub. No.: WO2007/148629
PCT Pub. Date: Dec. 27, 2007

(65) Prior Publication Data
US 2010/0309840 A1 Dec. 9, 2010

(30) Foreign Application Priority Data
Jun. 20, 2006 (JP) .................................. 2006-170702

(51) Int. Cl.
*G08C 25/02* (2006.01)
*H03M 13/00* (2006.01)

(52) U.S. Cl. ........................... 702/89; 714/748; 714/776

(58) Field of Classification Search .................... 702/89, 702/90; 340/3.2, 3.21, 9.14; 370/328
See application file for complete search history.

(56) References Cited

U.S. PATENT DOCUMENTS

| 6,567,376 B1 * | 5/2003 | Karlsson et al. ............. 370/216 |
| 6,909,718 B1 | 6/2005 | Aramaki et al. |
| 2003/0072310 A1 * | 4/2003 | Reme ........................... 370/394 |
| 2005/0013246 A1 * | 1/2005 | Miyake et al. ............... 370/230 |
| 2005/0039101 A1 | 2/2005 | Torsner |
| 2006/0045032 A1 | 3/2006 | Hamada |

FOREIGN PATENT DOCUMENTS

JP 2004-297742 A 10/2004
(Continued)

OTHER PUBLICATIONS

3GPP TR25.855, V5.0.0; "Technical Specification Group Radio Access Network; High Speed Downlink Packet Access; Overall UTRAN Description (Release 5)"; Sep. 2001 (28 pages).*

(Continued)

*Primary Examiner* — Sujoy Kundu
*Assistant Examiner* — Michael Dalbo
(74) *Attorney, Agent, or Firm* — Osha Liang LLP

(57) ABSTRACT

A disclosed radio communication apparatus includes a unit receiving a broadcast channel including a system frame number (SFN), a control channel including a process number (Proc) and a new data identification, and a user data channel including a sequence number; a unit detecting whether a received first packet includes an error and reporting the detection result indicating ACK or NACK to a transmitter side; a unit detecting whether the control channel has not been correctly received in the past based on the process number and the new packet identification information of a second packet transmitted after the first packet; and a unit reporting an indicator including the SFN at which the second packet is transmitted to the transmitter side, so that a packet is re-transmitted, the packet being transmitted to the radio communication apparatus by a preceding SFN that precedes an SFN at which the second packet is transmitted.

3 Claims, 3 Drawing Sheets

FOREIGN PATENT DOCUMENTS

| | | |
|---|---|---|
| TW | 245519 B | 12/2005 |
| WO | 03103159 A2 | 12/2003 |
| WO | 2004/077871 A1 | 9/2004 |

OTHER PUBLICATIONS

3GPP TSG-RAN2 Meeting #52, Tdoc R2-060907; Mar. 2006; "MAC functions: ARQ" (5 pages).*

Taiwanese Office Action for Application No. 096121965, mailed on Oct. 19, 2010 (5 pages).

esp@cenet Patent Abstract for Taiwanese Publication No. 245519, publication date Dec. 11, 2005. (1 page).

International Search Report w/translation from PCT/JP2007/062157 dated Jul. 17, 2007 (4 pages).

Written Opinion from PCT/JP2007/062157 dated Jul. 17, 2007 (3 pages).

Japanese Office Action for Application No. 2008-522435, mailed on Nov. 15, 2011 (5 pages).

Nokia, "HARQ-ARQ Interaction", 3GPP TSG-RAN WG2 Meeting #52, R2-060826, Athens, Greece, Mar. 27-31, 2006.

Ericsson, "HARQ-ARQ Interactions", 3GPP TSG-RAN WG2 Meeting #53, Tdoc R2-061398, Shanghai, China, May 8-12, 2006.

* cited by examiner

RADIO COMMUNICATION APPARATUS AND RADIO COMMUNICATION METHOD USED IN MOBILE COMMUNICATION SYSTEM

TECHNICAL FIELD

The present invention generally relates to a technical field of mobile communications, and more particularly to a radio communication apparatus and a radio communication method used in a mobile communication system.

BACKGROUND ART

In this technical field, various research and development efforts have been made at a rapid rate on the themes of a next-generation mobile communication system including a radio access system, re-transmission control, and handover.

FIG. 1 is a sequence diagram showing one example of a re-transmission procedure. In FIG. 1, the right-hand side shows the operations on a transmitting side of the entities of the Medium Access Control (MAC) sublayer (TxMAC) and the Radio Link Control (RLC) sublayer (TxRLC); and, the left-hand side shows the operations on a receiving side of the entities of the MAC sublayer (RxMAC) and the RLC sublayer (RxRLC). In downlink transmission, a base station serves as a transmitter and a user equipment (UE) serves as a receiver. On the other hand, in uplink transmission, a base station serves as a receiver and a user equipment ("UE") serves as a transmitter.

In steps S21 and S22 in FIG. 1, a packet to be transmitted is provided. Namely, the MAC sublayer sends a request (new data request) to the RLC sublayer to provide the packet to be transmitted. To respond to this request, the packet to be transmitted is provided in the MAC sublayer. In the example of FIG. 1, a sequence number "0" (SN=0) is added to the packet, namely a packet data unit (PDU).

Next, in step 11, the packet provided in the transmitting side is transmitted to the receiving side. In this transmission, the packet data unit including user data defined by the sequence number (SN) is transmitted through a data channel; the user equipment identification information (UE-ID), the process number (Proc), the New Data Indicator (NDI), and other control information items are transmitted through a control channel; and, as the system frame number (SFN) which indicate the absolute transmission timing in a cell, data broadcasted through the broadcast channel are used.

The receiver that received the control channel, the data channel, and the broadcast channel performs error detection by using a Cyclic Redundancy Check (CRC) method or the like with respect to the received packet. The error detection shows a negative (NACK) or affirmative (ACK) result. The former (NACK) denotes that an error beyond an allowable range is detected; and the latter (ACK) denotes that an error beyond the allowable range is not detected. In the case of FIG. 1, an error is detected (CRC:NG).

Next, in step S12, the error detection result is transmitted to the transmitting side. In response to the "negative" error detection result, the transmitting side identifies the packet that is related to the negative result, and re-transmits the identified packet. To make it possible to identify the packet, each of the packets radio-transmitted from the transmitting side is stored in a buffer (re-transmission buffer) after the transmission and discarded when a received response indicates that the error detection result is affirmative (ACK). By using this feature, upon receiving a negative error detection result, the packet transmitted before is identified in accordance with the result and re-transmitted.

As shown in step S12 of FIG. 1, a negative result (NACK) is transmitted to the transmitting side. Therefore, the transmitting side should appropriately re-transmit the packet upon recognizing the negative result. However and unfortunately, depending on the radio link conditions, the transmitting side (TxMAC) may incorrectly recognize the detection result, namely, the transmitting side may recognize as if an affirmative detection result were reported. Similarly, in the example of FIG. 1, even though a negative result is responded from the receiving side, the transmitting side continues its processes as if an affirmative result were reported from the receiving side.

As a result of this incorrect recognition, the subsequent different packet is provided in steps S23 and 24 and transmitted from the transmitting side (transmitter) to the receiving side (receiver) in step S13. In this transmission, the packet having SN=4 along with the control data of Proc=0 and NDI=1 is radio-transmitted at the timing SFN=8.

The receiver checks the received process number (Proc) and the new data indicator (NDI) and recognizes that it is not a re-transmission packet but a new packet that is transmitted even though a negative result has been previously reported to the transmitter. As a result, the receiver may recognize that the processes are being continued based on the wrong recognition in that the negative result is incorrectly recognized as an affirmative result.

Next, in step S14, in response to the error detection result, an indicator including the information indicating the system frame number (SFN=3) of the packet to be re-transmitted is provided and transmitted to the transmitting side. An object to be re-transmitted is the packet related to the negative error detection result and determined by the result of the error detection performed after step 11 and the relevant SFN. The indicator may be referred to as a False Ack Indicator (FAI).

The transmitter extracts the system frame number (SFN=3) from the reported indicator. The sequence number of the packet transmitted at the system frame number (SFN=3) is "0". This result is obtained based on the data stored in the transmitter side. By doing this, the sequence number of the packet to be re-transmitted is identified based on the reported system frame number.

Next, in step S25, the identified sequence number (SN=0) is reported to the TxRLC sublayer that manages the transmitted packets. Then, the packet having the sequence number (SN=0) is re-transmitted to the receiving side. To simplify the figure, any further steps following step S26 are not depicted in FIG. 1.

As described above, even when incorrect recognition of the error detection result (ACK/NACK) occurs in the transmitting side, the receiving side may identify the packet to be re-transmitted, thereby enabling performing appropriate re-transmission control. A method like this is described in, for example, R2-060907, "MAC functions: ARQ", Samsung.

DISCLOSURE OF INVENTION

Problems to be Solved by the Invention

However, depending on radio link conditions, the receiving side may not correctly receive the control channel in addition to the fact that incorrect recognition of the error detection result (ACK/NACK) occurs in the transmitting side. As described above, the control channel includes the user equipment information (UE-ID), the process number (Proc), the new data indicator (NDI), and the control information including transmission format information used for demodulating the data channel. Therefore, when the receiving side fails to receive the control channel, the data channel transmitted along with the control channel may not be demodulated. Further, a receiving side (a receiver) determines that received information is transmitted to the own receiver based on the received user equipment information (UE-ID). Because of this feature, when the control channel cannot be correctly received, the receiving side may be uncertain even whether a signal is being transmitted. Therefore, in this case, the receiver cannot report meaningful error detection results to the transmitting side. Even in such a case, the transmitting side may perform an appropriate re-transmission process as long as the transmitting side can recognize that the transmitting side does not receive the affirmative error detection result.

However, there may occur a case where the receiving side fails to receive the control channel and the transmitting side incorrectly recognizes the error detection result. In practical use, a situation like this may occur from time to time. In such a case, unfortunately, even when the receiving side correctly recognizes the information (such as SFN, Proc, and NDI) attached to the subsequent packet correctly received, the receiving side may not identify the frame number of the control channel to be re-transmitted. Therefore, it may be difficult to identify the packet to be re-transmitted, thereby preventing performing appropriate re-transmission control.

An object of the present invention is to reliably identify the packet to be re-transmitted and reinforce the re-transmission control function even in a case where the receiving side fails to receive the control channel and, additionally, the transmitting side incorrectly recognizes the error detection result.

Means for Solving the Problems

According to an aspect of the present invention, there is provided a radio communication apparatus used in a mobile communication system. The radio communication apparatus includes a unit receiving the broadcast channel including the SFN, the control channel including the process number (Proc) and the new data identification (NDI), and the user data channel including the sequence number; a unit detecting whether a received first packet includes an error and reporting the detection result indicating ACK or NACK to a transmitter side; a unit detecting whether a control channel has not been correctly received in the past based on the Proc and the NDI of a second packet transmitted after the first packet; and a unit reporting an indicator including the SFN at which the second packet is transmitted to the transmitter side, so that a packet is re-transmitted, the packet being transmitted to the radio communication apparatus by a preceding SFN that precedes an SFN at which the second packet is transmitted. The transmission timing at which the control channel has not been correctly received in the past may be identified by the preceding SFN.

Advantageous Effect of the Invention

According to an embodiment of the present invention, it may become possible to reliably identify the packet to be re-transmitted and reinforce the re-transmission control function even in a case where the receiving side fails to receive the control channel and the transmitting side incorrectly recognizes the error detection result.

EXPLANATION OF REFERENCES

11 RECEIVING SECTION
12 ACK/NACK DETERMINING SECTION
13 ERROR DETECTING SECTION
14 FAI GENERATING SECTION
21 NEW DATA REQUESTING SECTION
22 TRANSMISSION PACKET GENERATING SECTION
23 TRANSMITTING SECTION
24 FAI ANALYZING SECTION
31 TRANSMISSION BUFFER MANAGING SECTION

BEST MODE FOR CARRYING OUT THE INVENTION

Figure 2:
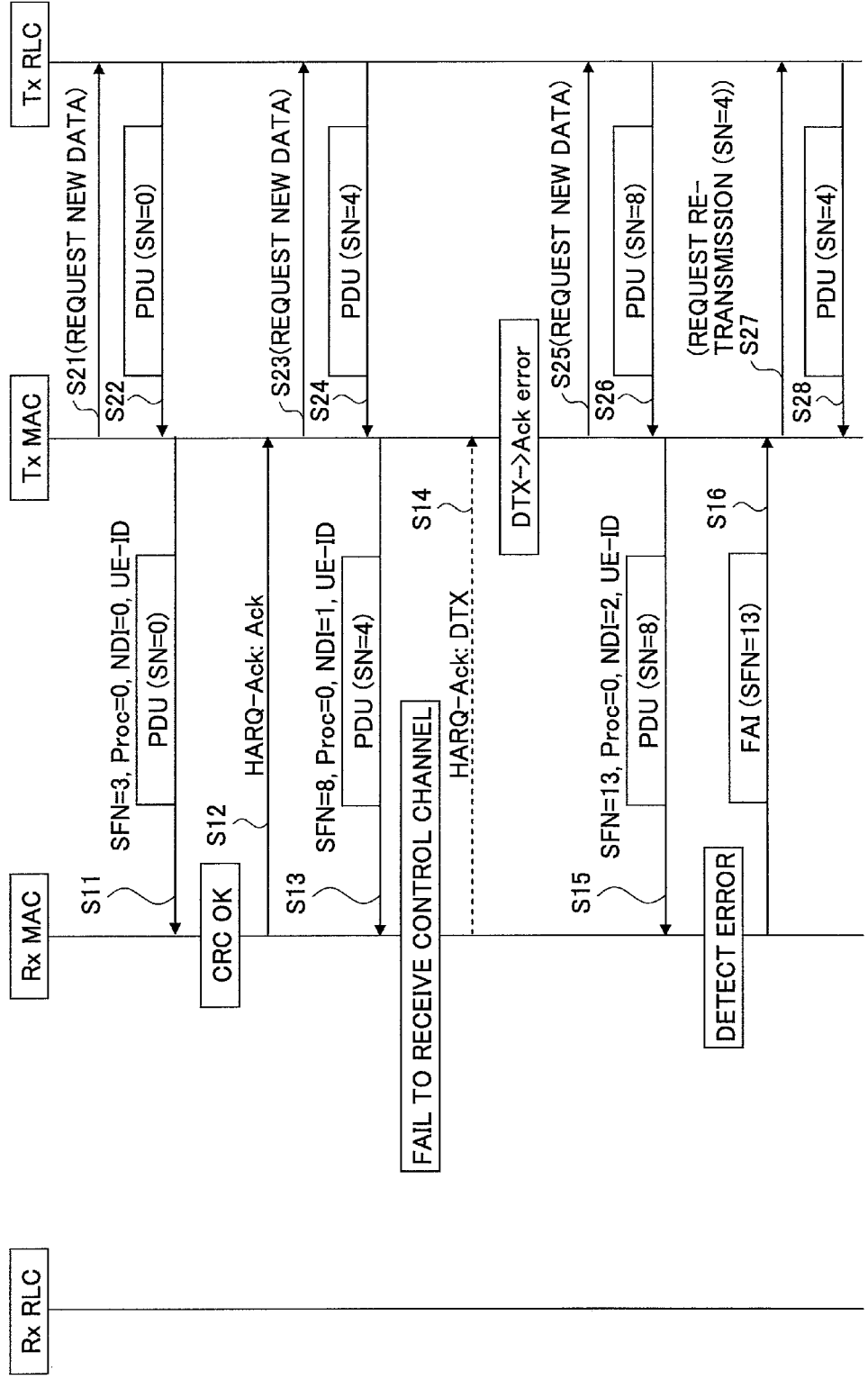
FIG. 2 is a sequence diagram showing an operational process according to an embodiment of the present invention.

FIG. 2 is a sequence diagram showing an operational process according to an embodiment of the present invention. The process may be used in uplink transmission where a base station serves as a receiver and a user equipment (UE) serves as a transmitter, and in downlink transmission where a base station serves as a transmitter and a user equipment serves as a receiver. In this description, it is assumed that the base station serves as a transmitter and the user equipment (UE) serves as a receiver for simplification purposes. In steps S21 and S22 in FIG. 2, a packet to be transmitted is provided. Namely, the MAC sublayer sends a request (new data request) to the RLC sublayer to provide the packet to be transmitted. To respond to this request, the packet to be transmitted is provided in the MAC sublayer. In the example of FIG. 2, a sequence number "0" (SN=0) is added to the packet, namely a packet data unit (PDU).

Next, in step 11, the packet provided in the transmitting side is transmitted to the receiving side. In this transmission, the packet data unit including the user data identified by the sequence number (SN) is transmitted through a data channel; the user equipment identified information (UE-ID), the process number (Proc), the New Data Indicator (NDI), and the control information including transmission format information used for demodulating the data channel are transmitted through a control channel; and, as the system frame number (SFN) which indicates the absolute transmission timing in a cell, data broadcasted through the broadcast channel are used.

Figure 1:
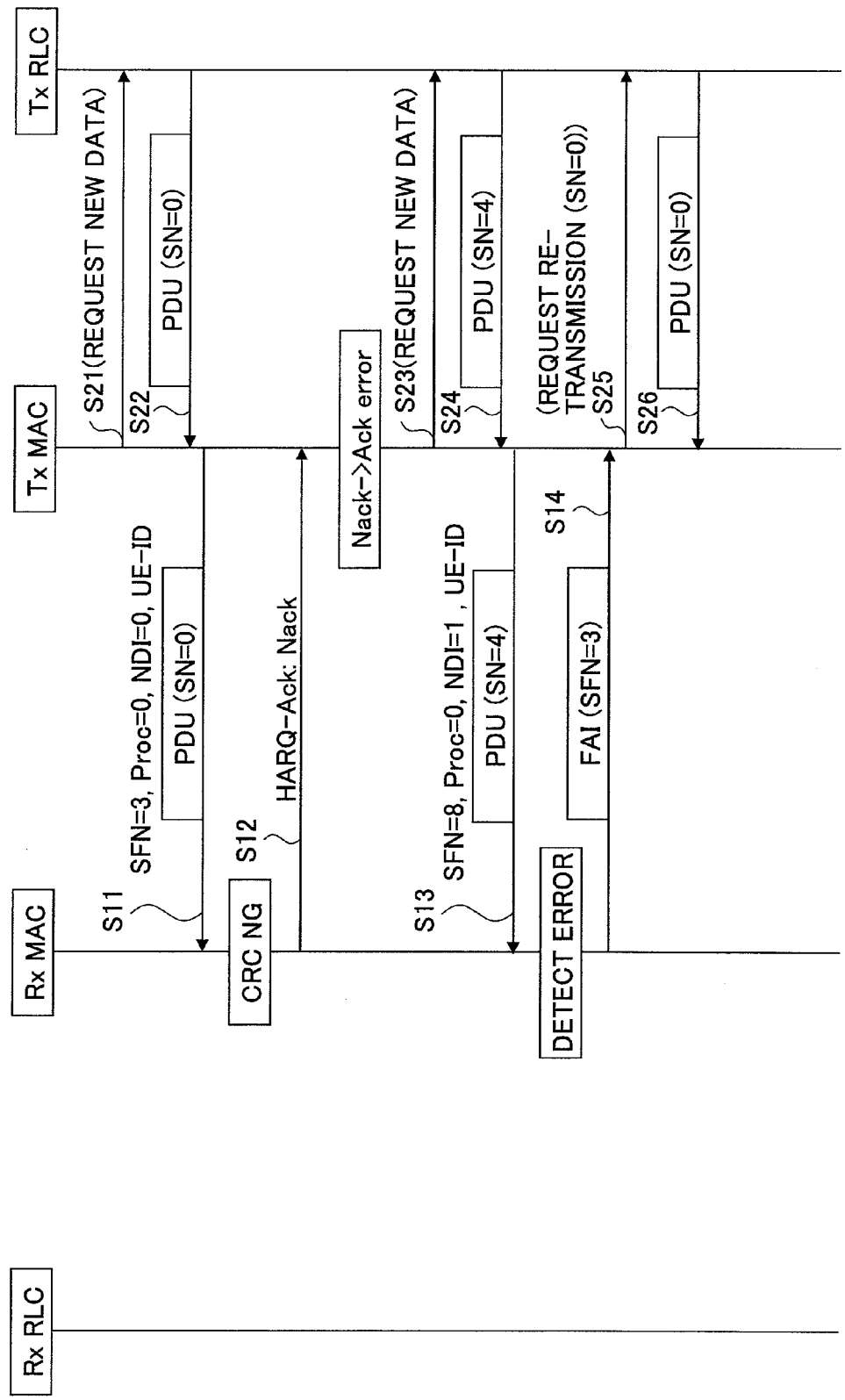
FIG. 1 is a sequence diagram showing a conventional operational process of treating incorrect recognition (ACK/NACK)

After receiving the control channel, the data channel, and the broadcast channel, the receiver performs error detection by using a Cyclic Redundancy Check (CRC) method or the like with respect to the received packet. The error detection shows a negative (NACK) or an affirmative (ACK) result. The former (NACK) denotes that an error beyond an allowable range is detected; and the latter (ACK) denotes that an error beyond the allowable range is not detected. In the case of FIG. 1, an error is not detected or the detected error is within the allowable range (CRC:OK).

Next, in step S12, the error detection result is transmitted to the transmitting side. In respond to the "affirmative" error detection result, the transmitting side identifies and transmits the packet to be transmitted next. In the example of FIG. 2, the packet having a sequence number SN=4 is transmitted.

In step S13, the packet is radio-transmitted along with parameters and values such as SN=4, Proc=0, NDI=1, SFN=8, and UE-ID. In this transmission, the specific data of the packet are transmitted through a data channel; the user equipment information (UE-ID), the control information such as the process number, and the new data indicator are transmitted through a control channel; and, as the system frame number, data broadcasted through the broadcast channel are used.

In this case, it is assumed that the receiving side fails to receive the control channel due to radio link conditions or the like. As described above, the receiving side determines that received information is transmitted to the own receiver based on the received user equipment information (UE-ID). Because of this feature, when the control channel cannot be correctly received, the receiving side may be uncertain even whether a signal is being transmitted. As a result, in this case, the error detection result is not reported. This phenomenon is depicted by a dotted line of step S14. Even in this case, an appropriate re-transmission process may be performed as long as the receiving side recognizes that no affirmative error detection result is obtained.

The example of FIG. 2 shows a case where the receiver fails to receive the control channel and the transmitter incorrectly recognizes the result of the error detection, namely the transmitter recognizes as if the affirmative result (ACK) were reported (DTX→Ack error). As a result of this incorrect recognition, a subsequent different packet is provided in steps S25 and 26 and transmitted from the transmitter to the receiver in step S15. In this transmission, the packet having SN=8 is radio-transmitted along with the control data of Proc=0 and NDI=2 at the timing SFN=13.

The receiver recognizes that the control channel has been incorrectly received in the past by referring to the received process number (Proc), the new data indicator (NDI), and the like and detecting a missing number. It should be noted that in the new data indicator (NDI), a prescribed number of figures are cyclically used. By doing this, it becomes possible to determine whether a packet is a re-transmitted packet or a new packet. Namely, in a case where the value of the process number is unchanged, when the value of the NDI is unchanged, the packet is a re-transmitted packet; otherwise, the packet is a new packet. In practical use, in a case of the same process number, when a value of the latest NDI is greater than a value of the previously received NDI by two or more, this phenomenon is detected as an error. However, by only the parameters that can be referred to by the receiver, it is not enough to determine that the packet to be re-transmitted is the packet of the control channel at the timing SNF=8.

According to an embodiment of the present invention, after such an error detection, an indicator including the latest system frame number (SNF=13) referred to in the error detection is generated. In step S16, this indicator is reported to the transmitting side. This indicator may be referred to as a False Ack Indicator (FAI). In step 14 of FIG. 1, a signal called "FAI" is transmitted. However, the FAI used in this embodiment is different from the FAI described with reference to FIG. 1 in that the FAI in this embodiment includes the latest SFN of the control channel, but the FAI described in FIG. 1 is not the latest SFN but the SFN of the packet to be re-transmitted (namely, the SFN associated to the control channel transmitted with the packet to be re-transmitted). Therefore, it should be clearly understood that the meaning of the FAI used in the embodiment is quite different from that of the FAI described in FIG. 1.

The transmitter extracts the system frame number (SFN=13) in the reported indicator. Among the system frame numbers preceding the system frame number (SFN=13), the value of the system frame number transmitted to the current user equipment identification (UE-ID) with the same process number (Proc) (may be referred to as preceding system frame number) is "8". It is assumed that necessary data for identifying the number are stored in the transmitting side.

The RLC sublayer manages the re-transmission buffer, so that each of transmitted packets is stored along with associated attribute information items until the corresponding affirmative result is reported. The associated attribute information items may include the user equipment identification (UE-ID), the sequence number (SN) of the packet, the system frame number (SFN) indicating the transmission timing, and the process number (Proc) designating a process number. In the example of FIG. 2, with respect to the packet transmitted to the receiver, such as the following information items may be stored in the re-transmission buffer.

SN=0:SFN=3, Proc=0
SN=4:SFN=8, Proc=0
SN=8:SFN=13, Proc=0
. . .

Based on the data, the transmitter may identify the sequence number (SN=4) of the packet to be re-transmitted based on the reported system frame number (SFN=13).

In step S27, the identified sequence number (SN=4) is reported to the TxRLC which manages the transmission packets, and then, the packet having the sequence number (SN=4) is transmitted. To simplify the figure, any further steps following step S28 are not depicted in FIG. 2.

It should be noted that the system frame number (SFN) may be expressed based on the minimum time unit such as a transmission unit (for example, 1.0 ms) of a radio packet, or based on a time unit larger than the minimum time unit. In the latter case, when a signal processing is performed in the minimum time unit, it becomes necessary to provide information corresponding to a time period shorter than that of the system frame number (SFN). As such information, a sub-frame number may be used. For example, when the SFN is in 10 ms steps, ten sub-frames having a frame time of 1.0 ms are included. Therefore, by using the sub-frame numbers "0" through "9", a process having a time unit shorter than the SFN may be performed. The sub-frame may be called a Transmission Time Interval (TTI), and the time period of the sub-frame is typically 1.0 ms. However, other value such as 0.5 ms may be used as the time period of the sub-frame.

Figure 3:
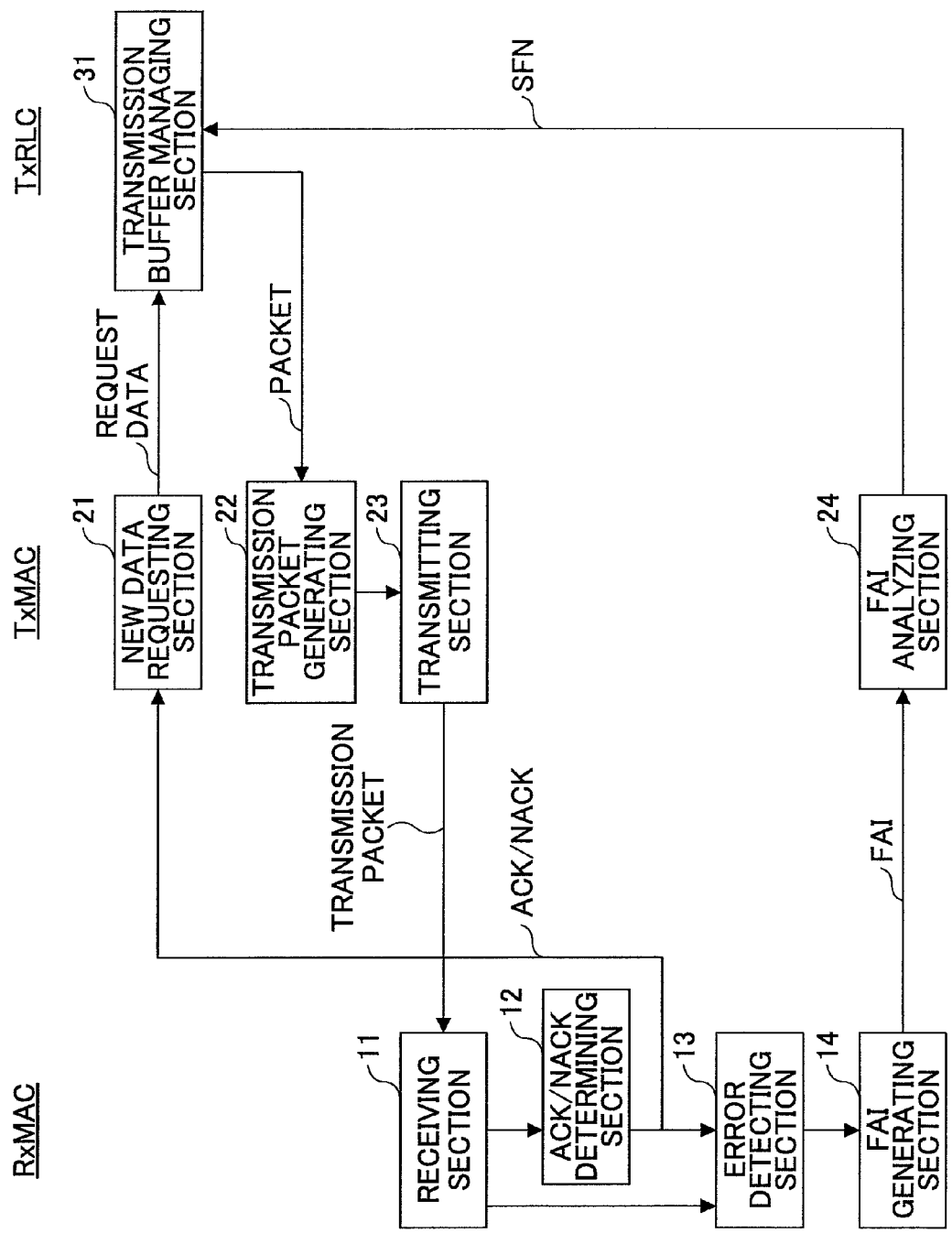
FIG. 3 is a functional block diagram with respect to the entities used in an embodiment of the present invention.

FIG. 3 is a functional block diagram with respect to the entities used in an embodiment of the present invention. The operational process as shown in FIG. 2 may be performed by using each of the functional elements shown in FIG. 3 with respective entities. As shown in FIG. 3, the "RxMAC" on the receiving side includes a receiving section 11, an ACK/NACK determining section 12, an error detecting section 13, and an FAI generating section 14. The "TxMAC" on the transmitting side includes a new data requesting section 21, a transmission packet generating section 22, a transmitting section 23, and an FAI analyzing section 24. The "TxRLC" on the transmitting side includes a transmission buffer managing section 31.

The receiving section 11 of the "RxMAC" on the receiving side receives a radio signal, extracts a signal to the own UE, and delivers the signal to a subsequent processing element. Further, the receiving section 11 informs information to the error detecting section 13, the information being the received process number (Proc), the new data indicator (NDI) value, and the system frame number (SFN) associated to the control channel to the own UE.

The ACK/NACK determining section 12 performs an error detection with respect to the received signal. The method of the error detection may be the CRC method. A result of the error detection is reported to the error detecting section 13 and the transmitting side as well.

The error detecting section 13 determines whether the reception of the control channel has failed in the past. When determining that the reception of the control channel has failed in the past, the error detecting section 13 sends a request to the FAI generating section 14 to generate the FAI.

The FAI generating section 14 generates the indicator including the system frame number (SFN) of the packet most recently received. The indicator is radio-transmitted.

The new data requesting section 21 of the "TxMAC" of the transmitter receives the error detection result (ACK/NACK) from the receiver. In accordance with the result, the new data requesting section 21 requests the buffer managing section 31 to provide data to be transmitted at the next transmission timing.

The transmission packet generating section 22 generates transmission packet so that the data can be radio-transmitted at the next transmission timing. The transmission data constitute the control channel and the data channel.

The transmitting section 23 transmits the generated transmission packet.

The FAI analyzing section 24 receives the indicator generated by the receiving side, and extracts the system frame number (SFN) from the indicator. The extracted SFN is sent to the buffer managing section 31.

The buffer managing section 31 of the "Tx RLC" on the transmitting side stores packets to be radio-transmitted in a buffer, and extracts the stored packets on an as needed basis to transmit the extracted packets to the transmission packet generating section 22. The buffer stores not only the packets to be initially transmitted but also the packets to be re-transmitted. The packets to be re-transmitted are stored along with the associated attribute information.

As described above, a radio communication apparatus and a radio communication method according to an embodiment of the present invention may be used in uplink and downlink transmissions. In downlink transmission, the base station serves as the transmitter and the user equipment (UE) serves as the receiver. In this case, the system frame number (SFN) is transmitted as broadcast information; the process number (Proc), the new data indicator (NDI), and the user equipment identification (UE-ID) are transmitted as the control information. On the other hand, in uplink transmission, the base station serves as the receiver and the user equipment serves as the transmitter. In this case, the "SFN" may be identified based on the "SFN" at the reception timing of the base station. The "Proc" may be identified based on the identified "SFN" (for example, identified by performing a prescribed modulo calculation with respect to the "SFN"). The "NDI" and the "UE-ID" may be identified by the base station based on a result of uplink scheduling. In the scheduling, it is determined which user may transmit uplink packets by using which resource. Further, by the base station storing the determined contents, the NDI, the UE-ID, and the like of the received packet may be identified.

The present invention is described above by referring to a specific embodiment. However, a person skilled in the art may understand that the above embodiment is described for illustrative purpose only and may think of examples of various modifications, transformations alternations, alternations, changes, and the like. To promote an understanding of the present invention, the specific values are used as examples throughout the description. However, it should be noted that such specific values are just sample values unless otherwise described, and any other values may be used. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alternation, exchanges, and the like may be made without departing from the scope and spirit from the present invention.

The present international application claims priority from Japanese Patent Application No. 2006-170702 filed on Jun. 20, 2006, the entire contents of which are hereby incorporated herein by reference.

The invention claimed is:

1. A radio communication apparatus used in a mobile communication system, comprising:
   a unit configured to receive a user data channel including a sequence number and determining a system frame number, a process number, and new packet identification information;
   a unit configured to detect whether a received first packet includes an error and transmitting a report of the detected result indicating an affirmative or a negative result to a transmitter side;
   a unit configured to detect whether a control channel has not been correctly received in the past based on the process number and the new packet identification information of a second packet transmitted after the first packet;
   a unit configured to generate an indicator consisting of the system frame number corresponding to a latest control channel having been correctly received; and
   a unit configured to report the system frame number of the indicator at which the second packet is transmitted, so that the transmitter side specifies the sequence number of a packet to be re-transmitted based on the system frame number, the packet being transmitted to the radio communication apparatus by a preceding system frame number preceding the reported system frame number at which the second packet is transmitted, wherein
   a transmission timing at which the control channel has not been correctly received is identified based on the preceding system frame number.

2. A radio communication apparatus used in a mobile communication system, comprising:
   a unit configured to transmit a user data channel including a sequence number;
   a unit configured to receive an error detection result indicating an affirmative or a negative result with respect to a transmitted first packet;
   a unit configured to receive, after a receiving side detects that a control channel has not been correctly received in the past based on a process number and new packet identification information of a second packet transmitted first after the first packet is transmitted, an indicator when the second packet is transmitted, the indicator consisting of a system frame number corresponding to a latest control channel having been correctly received;
   a unit configured to store attribute information including the sequence frame number and the sequence number corresponding to transmitted packets; and
   a unit configured to specify the sequence number of a packet that has not been correctly transmitted in the past based on the attribute information by using a system frame number preceding the system frame number at which the second packet is transmitted and re-transmit the packet.

3. A radio communication method used in a mobile communication system, comprising:
- a step of transmitting a user data channel including a sequence number from a transmitter to a receiver and determining a system frame number, a process number, and new packet identification information by the receiver;
- a step of detecting whether a first packet received by the receiver includes an error and transmitting a report of the detected result indicating an affirmative or a negative result to a transmitter side;
- a step of detecting whether a control channel has not been correctly received in the past based on the process number and the new packet identification information of a second packet transmitted after the first packet;
- a step of generating an indicator consisting of the system frame number corresponding to a latest control channel having been correctly received;
- a step of reporting the system frame number of the indicator at which the second packet is transmitted to the transmitter side;
- a step of storing attribute information including the sequence frame number and the sequence number corresponding to the transmitted packets;
- a step of specifying the sequence number of a packet that has not been correctly transmitted in the past based on the attribute information by using a system frame number preceding the reported system frame number at which the second packet is transmitted and retransmitting the packet, wherein
- a transmission timing at which the control channel has not been correctly received by the receiver is identified based on the preceding system frame number.

* * * * *